June 24, 1952  W. A. McGREW  2,601,312
COASTER
Filed April 15, 1946
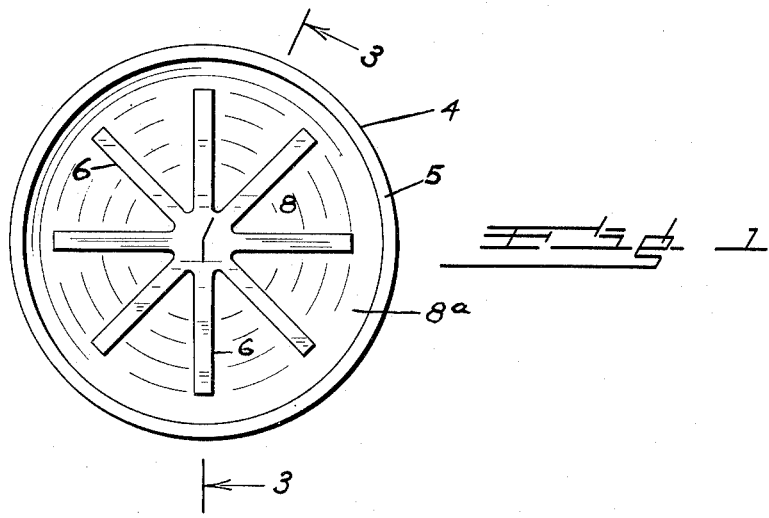
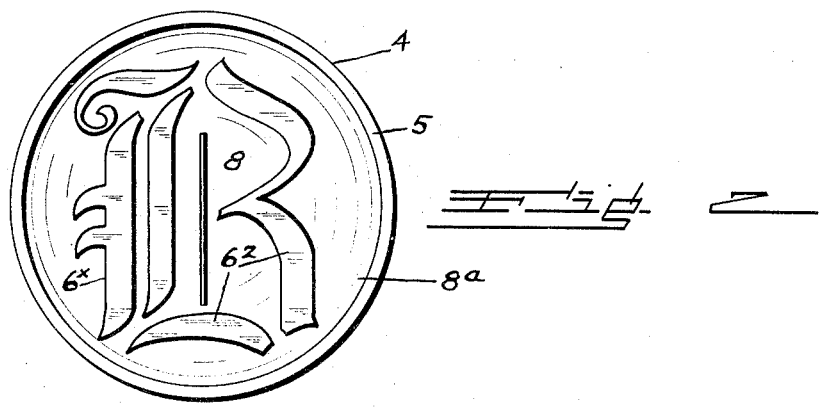
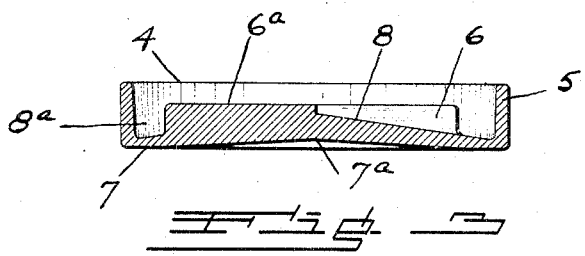
INVENTOR.
William A. McGrew Patented June 24, 1952

2,601,312

UNITED STATES PATENT OFFICE 2,601,312

COASTER

William A. McGrew, Denver, Colo.

Application April 15, 1946, Serial No. 662,205

2 Claims. (Cl. 65—53)

This invention relates to coasters for beverage glasses and the like. Such coasters are subjected to a variety of uses under different conditions, and many of the coaster designs commonly in use, while satisfactory for certain purposes, are not suited for others. More specifically, such coasters are used to protect table tops and the like from contact with beverage glasses usually containing substantial quantities of ice. Where such a glass is allowed to stand for considerable periods, atmospheric moisture will condense on the cold exterior surface of the glass and drains to the support on which the glass rests. Unless suitable drainage is provided, the glass tends to stick to the coaster on which it is placed, frequently causing spilling, either of the contents of the glass or of the collected moisture on or in the coaster and breakage of the coaster when it is formed of glass or similar compositions.

It is an object of the present invention to provide a simple, durable and efficient coaster having an adequate supporting surface for beverage glasses of either flat or rounded contour and providing adequate drainage of condensed moisture forming on the glass.

Another object of the present invention is to provide a coaster design for beverage glasses which is adapted to be formed in a variety of materials to satisfy individual requirements of the user without impairment of efficiency.

A further object of the invention is to provide a coaster design in which individual identification is provided and utilized as the glass supporting surface of the coaster.

Other objects reside in novel details of construction and novel combinations and arrangements of parts, all of which will appear more fully in the course of the following description.

To afford a better understanding of the invention, reference will be made to the accompanying drawings illustrating typical embodiments. In the drawings, in the several views of which like parts have been designated similarly, Fig. 1 is a top plan view of a coaster embodying features of this invention;

Fig. 2 is a top plan view of a modified form of coaster embodying features of this invention; and Fig. 3 is a developed section taken along the lines 3—3, Fig. 1.

As shown in the drawings, the devices of the present invention provide multiple points of support, so spaced that even beverage glasses with rounded bottoms are given sufficient support, even if carelessly placed on the coaster, to prevent accidental tipping. Despite the proximity of the points of support, adequate spacing is provided to insure free drainage of condensed moisture from a glass seated on the coaster, and adequate air circulation underneath the glass to maintain its bottom in essentially dry condition.

Collecting moisture is caused to flow by gravity into an annular basin near the periphery of the coaster, which is of sufficient depth to retain substantial quantities of liquid without wetting the bottom of a glass seated on the coaster. To this end, the bottom surface of the coaster within the enclosure provided by an upstanding rim slopes downwardly from a central point, preferably the axis of the body, to the outer basin portion to provide an accelerated run-off condition.

As exemplified in the form illustrated in Figs. 1 and 3, a wafer-like body 4, preferably in the form of a disc, has an upstanding peripheral rim 5, the upper edge of which is elevated relative to the other portions of the body. A series of ribs 6, here shown in radial arrangement, but which may be any suitable geometric or ornamental design, have their top surfaces 6a lying in a common plane which preferably parallels the supporting surface on which the coaster is placed.

To this end, the under bottom surface 7 preferably is flat, at least adjoining the periphery, and as shown at 7a, may be hollowed slightly to reduce the weight of material comprising the bottom. This flat bottom surface should be smooth so that it will not mar polished furniture surfaces, such as table tops, on which it may be placed in use. The upper bottom surface 8 slopes from a point centrally of the bottom to an annular recessed basin 8a adjoining rim 5 and thus provides the accelerated run-off and moisture storage aforementioned.

The form of the invention shown in Fig. 2 is essentially the same as Fig. 1, except that the ribs 6x in this form are arranged as an initial, here shown as a modified Old English type letter B. The spacing between the several ribs 6x permits free drainage from any high points on bottom 8 into the basin 8a, and the tops 6z of said ribs are formed in a common plane parallel to the flat portion of the under bottom surface 7. In the designs thus far described, the spacing of the supporting ribs to provide plural points of support for the beverage glass has the further advantage of providing an air pocket underneath the glass at all times so that there will be no tendency for the coaster to stick to the glass when it is raised, as frequently occurs in other designs through the formation of a partial vacuum condition.

A variety of materials may be utilized in producing the coasters of this invention, such as metals, of which die cast aluminum or bronze are typical; molded plastics, either clear, colored, or opaque; glass; or ceramic compositions. The ornamentation may be varied substantially without change in the functional features and a variety of color effects, either single or pluraltone, may be utilized to blend with decorating schemes of the user.

Due to the provision of the common functional features, the main body portion for all designs can be produced in the same fabricating operation and then individual variations of the rib arrangement can be produced as required. I prefer to form the body 4 as a disc, but any other wafer-like shape will be suitable. The forms illustrated and described are intended as typical examples of the practice of the invention, but not to limit it; the scope of the invention having been set forth in the hereunto appended claims.

What I claim and desire to secure by Letters Patent is:

1. A coaster for beverage glasses or the like, comprising a body with a substantially vertical peripheral flange and a raised central portion, the upper and lower surfaces of the bottom of said body inclining downwardly from said central portion to said flange with the upper surface more steeply sloped than the lower surface, and a plurality of narrow widely spaced radial ribs extending upwardly from said upper surface and terminating in proximate but spaced relation to said flange, the top surfaces of said central portion and said ribs being in a common plane substantially parallel to the lower surface of the body on which the coaster rests and below the top edge of said flange, thus providing a seat for a beverage glass, the part of said upper surface between the ends of said ribs and said flange being at a lower elevation than any other part of said upper surface to form a deep annular collecting basin.

2. A coaster for beverage glasses or the like, comprising a body with a substantially vertical peripheral flange, the upper and lower surfaces of the bottom of said body inclining downwardly from the central portion to said flange with the upper surface more steeply sloped than the lower surface, and a plurality of narrow widely spaced ribs extending upwardly from said upper surface to form a decorative initial in relief and terminating in proximate but spaced relation to said flange, the top surfaces of said initial forming ribs being in a common plane substantially parallel to the lower surface of the body on which the coaster rests and below the top edge of said flange, thus providing a seat for a beverage glass, the part of said upper surface between the ends of said ribs and said flange being at a lower elevation than any other part of said upper surface to form a deep annular collecting basin adjacent the peripheral flange, said ribs being disconnected and arranged to provide relatively wide drainage channels therebetween to facilitate flow from said high central portion to said deep annular collecting basin.

WILLIAM A. McGREW.

REFERENCES CITED

The following references are of record in the file of this patent:

UNITED STATES PATENTS

| Number | Name | Date |
|---|---|---|
| D. 122,585 | Frank | Sept. 17, 1940 |
| D. 128,150 | Swofford | July 8, 1941 |
| 424,028 | Sautter | Mar. 25, 1890 |
| 506,120 | Kiel | Oct. 3, 1893 |
| 1,662,146 | Elliott | Mar. 13, 1928 |
| 1,981,627 | Merriman | Nov. 20, 1934 |

FOREIGN PATENTS

| Number | Country | Date |
|---|---|---|
| 19,337 | Great Britain | Sept. 26, 1899 |
| 204,375 | Great Britain | Sept. 24, 1923 |
| 424,544 | Great Britain | Feb. 22, 1935 |
| 525,264 | Great Britain | Aug. 26, 1940 |
| 709,652 | France | May 20, 1931 |